June 29, 1965 W. DZUS 3,191,653
FASTENER RECEPTACLE FOR THREADED FASTENER STUDS
Filed July 12, 1963
FIG. 1
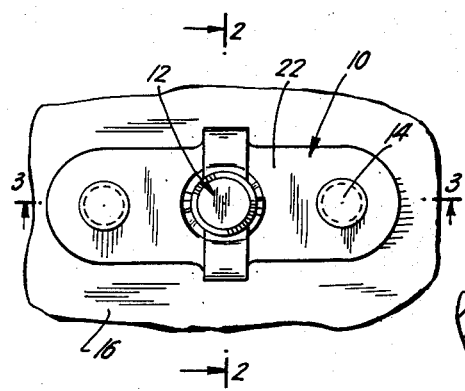
FIG. 2
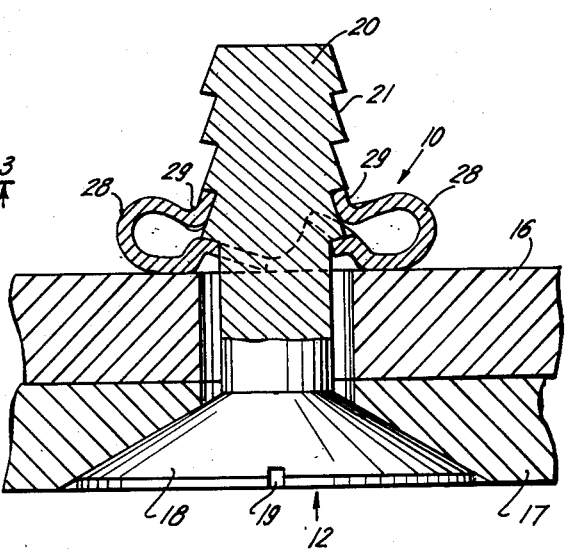
FIG. 4
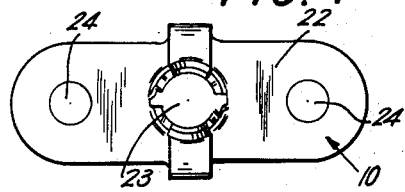
FIG. 5
FIG. 6
FIG. 3
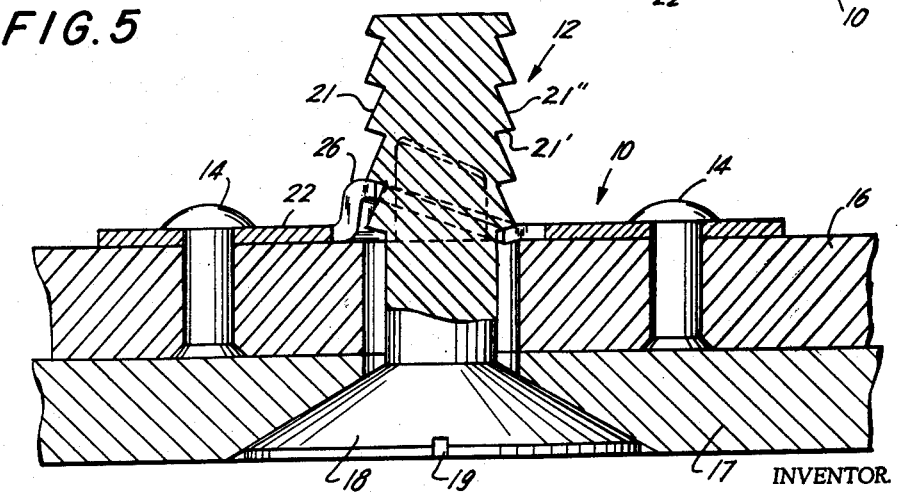
INVENTOR.
WILLIAM DZUS
BY
ATTORNEYS

United States Patent Office 3,191,653
Patented June 29, 1965

3,191,653
FASTENER RECEPTACLE FOR THREADED FASTENER STUDS
William Dzus, West Islip, N.Y.; Theodore Dzus, Francis X. Clarke, and Daniel H. Kane, executors of said William Dzus, deceased
Filed July 12, 1963, Ser. No. 294,583
1 Claim. (Cl. 151—21)

This invention relates to an improved fastener receptacle for use with a threaded fastener stud.

Among the objects of my present invention are the provision of an improved fastener receptacle for use with a threaded fastener stud which is relatively inexpensive to manufacture; which is simple to install and use; which, when assembled with a threaded stud, is releasably retained against accidental release but can be readily released when desired; which can be repeatedly applied to and removed from a stud without detracting from the functioning thereof; and, which will give satisfactory service over a long period of time with comparative freedom from trouble and wear.

My invention contemplates the provision of an improved fastener receptacle for use with a fastener stud made of sheet metal and formed with an aperture for accommodating the shank of the stud extending therethrough. The threaded portions in the form of helical segments are formed integrally with the body portion and extend along edges of the aperture for engagement with the threads of a stud projecting therethrough. The receptacle is also provided with retaining portions in the form of spring arms projecting from the body portion in reversely curved bends and terminating in abutment portions for resiliently and frictionally engaging the threads of the stud to thereby releasably retain the parts in assembled relationship.

In the accompanying drawing:

FIG. 1 is a plan view from the face of a fastener receptacle embodying my invention showing it assembled with a threaded stud and mounted on a suitable support;

FIGS. 2 and 3 are sectional views in the direction of the arrows on the lines 2—2 and 3—3 respectively of FIG. 1;

FIG. 4 is a plan view of the face of the receptacle showing it in unmounted and disassembled condition;

FIG. 5 s a side elevational view of the receptacle; and,

FIG. 6 is an end elevational view thereof.

My improved receptacle is shown generally at 10 and in FIGS. 1, 2 and 3 it is shown as assembled with a threaded stud 12. In the same figures the receptacle is shown as attached to a supporting plate 16 by suitable means such as rivets 14.

Stud 12 is provided with a head portion 18 having a screwdriver slot 19 formed therein. A shank 20 is integrally attached to the head and is threaded as shown at 21. The stud 20 is shown as assembled with a plate 17 with the shank portion thereof extending through an aperture in plate 17 and an aperture in plate 16 into engagement with receptacle 10.

Referring now to my improved receptacle it is preferably made of suitable sheet metal having the desired characteristics so that it can be stamped and formed and so that spring retaining arms can be formed thereon. For this purpose I may use carbon, alloy, or stainless steel, beryllium copper and certain alloys of aluminum. I prefer to employ one of the indicated types of steel.

The receptacle has a body portion 22 in the form of a flat plate having a central aperture 23 extending therethrough. The shape of the plate or body portion 22 may vary. In the illustrated embodiment the plate is of elongated shape and is provided with rivet holes 24 whereby the receptacle may be mounted on a suitable support as by rivets 14.

I provide the receptacle with suitable thread portions for engaging the threads of the stud with which it is used. For this purpose I prefer to provide helical segments 26 formed integrally with the body portion and having a pitch substantially the same as the pitch of the threads of the stud with which the receptacle is used. The number of segments may vary. They are preferably arranged in equally spaced relationship. I have found that satisfactory results are obtained by using two diametrically opposed helical segments 26. The segments extend along opposite edges of the aperture as shown so as to engage the threads of the stud extended through the aperture. Thus the stud may be assembled with the receptacle in the usual manner simply by inserting the end of the shank in the aperture and rotating the stud in a clockwise direction. The parts can be disassembled by rotating the stud in the opposite direction.

In order to retain the parts against accidental release I provide the receptacle with retaining portions in the form of spring arms 28 projecting integrally from peripheral edge portions of the body portion 22 in reversely curved bends and extending inwardly into positions adjacent, but spaced outwardly from, the edges of aperture 23. The spring arms terminate in abutment portions 29 bent outwardly away from the body portion of the receptacle as shown. The outer edges of the spring arms are angularly disposed and correspond generally in pitch to the pitch of the threads of the stud. The abutment portions of the spring arms are spaced outwardly from the helical segments so as to engage the threaded portion of the stud in a plane spaced outwardly from the point of engagement with the helical segments. In this connection the abutment portions resiliently and frictionally engage the threads so as to thereby releasably retain the parts in assembled relationship. The number of spring arms may be varied; they are preferably arranged in equally spaced relationship. I have found that satisfactory results are obtained when two diametrically opposed spring arms are employed as shown.

It should be noted that the threads of the stud have first and second side walls namely, side wall 21′ facing towards the head and side wall 21″ facing away from the head at an angle. The helical segments preferably engage the first side wall and the bearing surfaces of the abutment portions of the retaining arms preferably engage the second side wall. This helps to retain the assembly against accidental release. To reinforce the engagement between the bearing surfaces and the second side wall, the abutment portions are so arranged that the outer edges thereof engage the first side wall of the stud threads outwardly from the helical segments 26 to thereby exert a camming action to press the bearing surfaces against the second side walls. The leading and trailing ends of the outer edges are preferably relieved, or shown, to prevent scoring or bending.

In using my improved fastener receptacle it is assembled with a suitable support such as the plate 16 with the aperture in the receptacle in alignment with the aperture in the support and it is secured in place as by means of rivets 14. The fastener stud 12 is assembled with another plate 17 and the shank thereof is extended through apertures in the plates into the aperture in the receptacle. The parts can be assembled and tightened by then rotating the stud in a clockwise direction. The helical segments engage the threads of the stud in the same manner as to the threads of a nut. The abutment portions of the spring arms resiliently and frictionally engage the threads outwardly from the helical segments to releasably retain the parts in assembled relationship. The parts can be disassembled simply by rotating the stud in an anticlockwise direction.

It will thus be seen that I have provided an improved fastener receptacle for use with a threaded fastener stud which is of relatively simple construction; which can be assembled with a threaded stud so as to releasably retain the parts in assembled relationship; which can be repeatedly applied and removed without adversely affecting the functioning thereof; and, which can be used over a long period of time with substantial freedom from wear. Modifications may be made in the illustrated and described embodiment of the invention without departing from the invention as set forth in the claim.

I claim:

A fastener receptacle for use with a fastener stud having a shank formed with threads having first and second side walls and comprising: a body portion made of sheet metal and formed with an aperture large enough to accommodate the shank of the stud with which it is used extending through the body portion, a pair of threaded portions in the form of a pair of helical segments having substantially the same pitch as the threads of the stud with which it is used and being integral with the body portion and extending along edge portions of the aperture in diametrically spaced relationship so as to be engageable with a first side wall of the threads of a stud extending therethrough, and a pair of retaining portions in the form of a pair of spring arms integral with the body portion and projecting from the peripheral edge thereof in diametrically opposite relationship in reversely curved bends and terminating in abutment portions bent outwardly away from the body portion having angularly disposed edges with a pitch corresponding generally to the pitch of the threads of the stud with which the receptacle is used, and engageable with the first side wall thereof at points spaced from points of engagement with the segments, said abutment portions being disposed adjacent diametrically opposite edge portions of the aperture in a plane spaced outwardly therefrom and said spring arms having inwardly facing bearing surfaces beneath said abutment portions which resiliently and frictionally engage the second side wall of the threads of a stud extending through the aperture in engagement with the helical segments to thereby releasably retain the parts in assembled relationship.

References Cited by the Examiner

UNITED STATES PATENTS

| | | | |
|---|---|---|---|
| 2,047,298 | 7/36 | Tinnerman | 85—36 |
| 2,171,773 | 9/39 | Von Mertens | 85—36 |
| 2,434,844 | 1/48 | Flora. | |
| 2,494,882 | 1/50 | Kost | 85—36 |
| 2,560,518 | 7/51 | Amesbury. | |

EDWARD C. ALLEN, *Primary Examiner.*